(12) United States Patent
Sylla et al.

(10) Patent No.: US 8,887,489 B2
(45) Date of Patent: Nov. 18, 2014

(54) NOISE CONTROL CHEVRON FOR A NOZZLE, AND NOZZLE AND TURBOSHAFT ENGINE PROVIDED WITH SUCH A CHEVRON

(75) Inventors: Amadou André Sylla, Toulouse (FR); Jérôme Huber, Toulouse (FR); Olivier Pelagatti, Toulouse (FR); Damien Prat, Colomiers (FR); Klaus Debatin, Bonrepos sur Aussonelle (FR)

(73) Assignee: Airbus Operations (SAS), Toulouse (FR)

( * ) Notice: Subject to any disclaimer, the term of this patent is extended or adjusted under 35 U.S.C. 154(b) by 1189 days.

(21) Appl. No.: 12/672,796

(22) PCT Filed: Aug. 4, 2008

(86) PCT No.: PCT/FR2008/001165
§ 371 (c)(1),
(2), (4) Date: Feb. 9, 2010

(87) PCT Pub. No.: WO2009/053554
PCT Pub. Date: Apr. 30, 2009

(65) Prior Publication Data
US 2011/0192167 A1  Aug. 11, 2011

(30) Foreign Application Priority Data
Aug. 14, 2007 (FR) ...................................... 07 05847

(51) Int. Cl.
*F02K 1/48* (2006.01)
*F02K 1/38* (2006.01)

(52) U.S. Cl.
CPC . *F02K 1/386* (2013.01); *F02K 1/48* (2013.01); *Y02T 50/671* (2013.01); *F05D 2250/11* (2013.01)
USPC ........... 60/264; 60/770; 239/265.19; 181/220

(58) Field of Classification Search
USPC ............ 60/262, 264, 770, 226.1; 239/265.19; 181/213, 220
See application file for complete search history.

(56) References Cited

U.S. PATENT DOCUMENTS

| | | | | | |
|---|---|---|---|---|---|
| 4,311,291 | A | * | 1/1982 | Gilbertson et al. | 239/265.19 |
| 4,487,017 | A | * | 12/1984 | Rodgers | 60/264 |
| 7,305,817 | B2 | * | 12/2007 | Blodgett et al. | 60/226.1 |
| 7,469,529 | B2 | * | 12/2008 | Feuillard et al. | 60/226.1 |

(Continued)

FOREIGN PATENT DOCUMENTS

EP  1580419 A1 *  9/2005
FR  2565631     12/1985

(Continued)

*Primary Examiner* — Ted Kim
(74) *Attorney, Agent, or Firm* — Novak Druce Connolly Bove + Quigg LLP

(57) ABSTRACT

According to the invention, the shape of each of said chevrons is defined: by two lateral sides (21, 22) having front ends (21A, 22A) that are connected to said nozzle (4, 10) and that, when moving away from the latter, converge towards each other without joining so that the rear ends (21R, 22R) of said lateral walls (21, 22) are spaced from each other; and by a curvilinear transverse line (23.1) connecting the rear ends (21R, 22R) of said lateral walls (21, 22) by forming two rounded side protrusions (24.1, 25.1) separated by an intermediate rounded recess (26.1).

6 Claims, 4 Drawing Sheets

(56) References Cited

U.S. PATENT DOCUMENTS

| | | | |
|---|---|---|---|
| 7,966,824 B2 * | 6/2011 | Mengle | 60/770 |
| 2002/0178711 A1 | 12/2002 | Martens | |
| 2005/0115245 A1 | 6/2005 | Prouteau et al. | |
| 2006/0010853 A1 | 1/2006 | Goutines et al. | |
| 2006/0053769 A1 | 3/2006 | Feuillard et al. | |
| 2008/0041062 A1 | 2/2008 | Au et al. | |
| 2008/0047273 A1 | 2/2008 | Au et al. | |

FOREIGN PATENT DOCUMENTS

| | | |
|---|---|---|
| FR | 2902758 | 12/2007 |
| GB | 766985 | 1/1957 |
| GB | 2289921 | 12/1995 |

\* cited by examiner

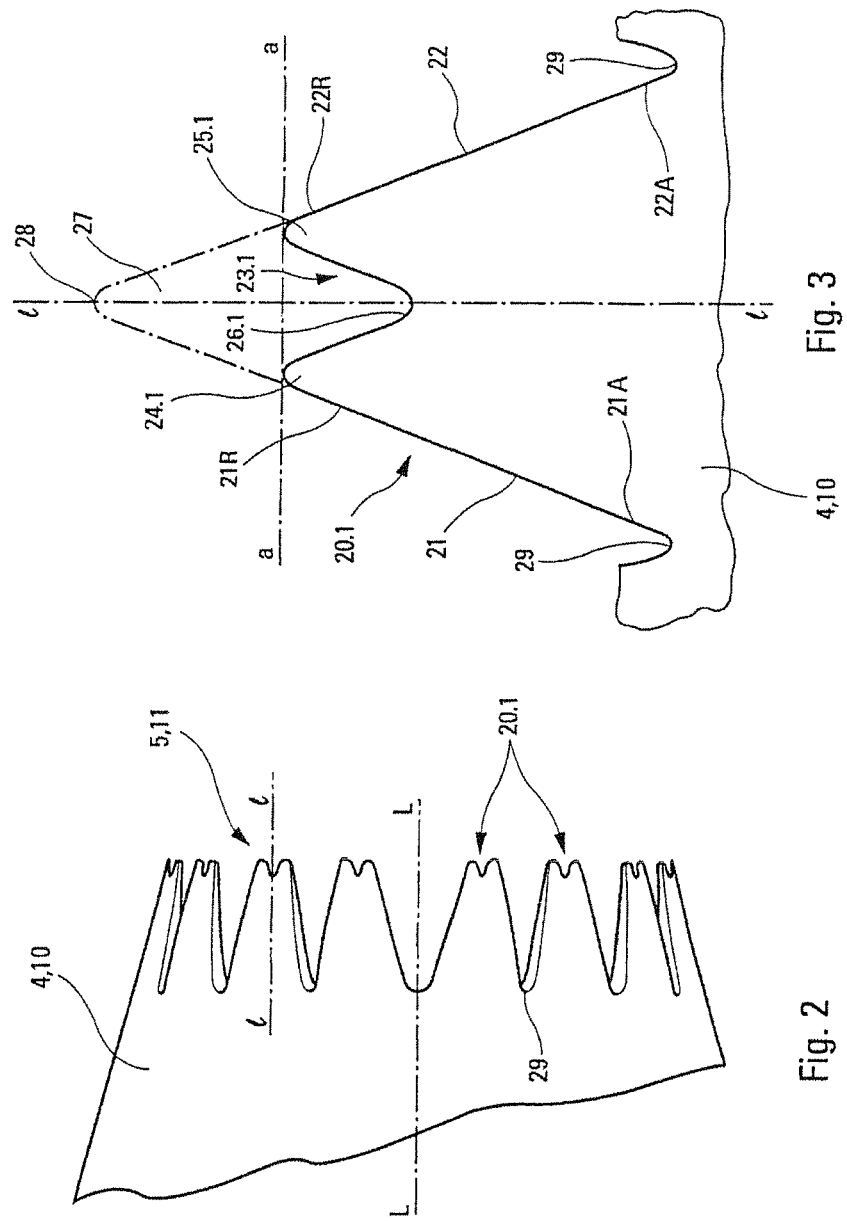

NOISE CONTROL CHEVRON FOR A NOZZLE, AND NOZZLE AND TURBOSHAFT ENGINE PROVIDED WITH SUCH A CHEVRON

CROSS-REFERENCE TO RELATED APPLICATIONS

This application is a §371 national stage entry of International Application No. PCT/FR2008/001165, filed Aug. 4, 2008, which claims priority to French Patent Application 0705847, filed Aug. 14, 2007, the entire contents of which are incorporated herein by reference.

FIELD OF THE INVENTION

The present invention relates to noise-reducing chevrons for the nozzles of aircraft turbojet engines, and to the nozzles provided with said chevrons and the turbojet engines provided with at least one such nozzle.

BACKGROUND OF THE INVENTION

It is known that, at the rear of a turbojet engine nozzle, the jet emitted by this nozzle comes into contact with at least one other gaseous flow: in the case of a straight-flow turbojet engine, this jet comes into contact with the ambient air whereas, in the case of a bypass turbojet engine, the cold flow and the hot flow come into contact, not only with one another, but also with the ambient air.

Because the speed of the jet emitted by said nozzle differs from the speed of said other gaseous flow or flows encountered by said jet, this results in fluidic shear as said flows interpenetrate, said fluidic shear giving rise to noise, generally known as "jet noise" in aeronautical parlance.

In order to attenuate such jet noise, the idea of generating turbulence at the boundaries between said flows with different speeds has already been put forward.

For example, document GB-A-766 985 describes a nozzle of which the outlet orifice is provided, at its periphery, with a number of projections which extend rearward and the overall direction of which is at least approximately that of the jet emitted by said nozzle. Such projections consist of "teeth" which may exhibit numerous different shapes.

As an alternative, document GB-A-2 289 921 proposes to make notches in the edge of the outlet orifice of the nozzle. Such notches are distributed about the periphery of said outlet orifice and each of them generally has the at least approximate shape of a triangle, the base of which coincides with said edge of the outlet orifice and the vertex of which is situated forward of this outlet edge. This results in the formation, between two consecutive notches, of a tooth in the at least approximate shape of a triangle or trapezoid.

Whatever their precise shape, such teeth are generally known in aeronautical parlance as "chevrons".

The known chevrons are generally effective at attenuating jet noise but have the disadvantage of giving rise to a significant amount of drag, particularly in cruising flight.

In order to address this disadvantage, it is already known practice (known for example from EP-1 580 419) for the length of the chevrons to be shortened. To do this, the shape of each chevron is delimited:

by two lateral sides of which the front ends are secured to said nozzle and which, with increasing distance therefrom, converge toward one another without meeting so that the rear ends of said lateral sides are separated from one another; and by a transverse line which connects the rear ends of said lateral sides thereby forming two lateral protrusions separated by an intermediate recess.

However, in such a known chevron, said lateral protrusions and said intermediate recess form sharp points which behave as additional parasitic noise sources. Hence, whatever is saved in terms of drag is lost in terms of noise.

It is an object of the present invention to reduce the noise emissions of such a known chevron while at the same time enjoying its reduction in drag.

SUMMARY OF THE INVENTION

To this end, according to the invention the chevron which is positioned at the periphery of an outlet orifice for the jet from a turbojet engine nozzle for the purposes of attenuating the noise of said jet and the shape of which is delimited:

by two at least approximately rectilinear lateral sides of which the front ends are secured to said nozzle and which, with increasing distance therefrom, converge toward one another without meeting so that the rear ends of said lateral sides are separated from one another; and by a transverse line which connects the rear ends of said lateral sides thereby forming two lateral protrusions separated by an intermediate recess, is notable in that said transverse line is curvilinear in such a way that said lateral protrusions and said intermediate recess are rounded.

Thus, without emitting any additional parasitic noise, each of the rounded lateral protrusions of such a chevron generates a vortex, the two vortices of a chevron being nested and contra-rotating. The entire set of said chevrons therefore generates a swirling vortex system that rapidly homogenizes the gaseous flows at the rear of the nozzle. This results then in rapid attenuation of jet noise.

Furthermore, by comparison with a known triangular chevron, which would be formed by said lateral sides converging until they meet, it will be noted that a chevron according to the present invention is shorter (and therefore has a lower mass and less drag than said triangular chevron). Specifically, said chevron according to the present invention therefore takes the form of said known triangular chevron truncated by said transverse line, but with better noise attenuation efficiency.

Hence, by virtue of the present invention, it is possible for an aircraft the nozzles of which are fitted with said chevrons to be quiet during landing and takeoff phases and to exhibit a reduced amount of drag in cruising flight. The present invention also makes it possible to improve the noise in the phases of cruising flight and ascent, the end-result being a quieter aircraft cabin.

The shape of a chevron according to the invention may be symmetric with respect to a median longitudinal axis the overall direction of which is that of said jet.

As an alternative, with the lateral sides of said chevrons symmetrically inclined to one another with respect to said median longitudinal axis, said rounded lateral protrusions can be offset from one another along this axis.

A turbojet engine nozzle according to the present invention therefore comprises a plurality of chevrons, as described hereinabove, distributed at the periphery of the outlet orifice for said jet. All the chevrons borne by said orifice may be identical. As an alternative, two consecutive chevrons may differ from and be symmetric to one another with respect to the overall direction of said jet.

When the turbojet engine is of the bypass type, with one nozzle for the cold flow and one nozzle for the hot flow, at least one of said nozzles is of the abovementioned type.

Advantageously, the nozzle for the cold flow and the nozzle for the hot flow are provided with chevrons according to the present invention.

BRIEF DESCRIPTION OF THE DRAWINGS

The figures of the attached drawing will make it easy to understand how the invention may be embodied. In these figures, identical references denote elements that are similar.

FIG. 2 is an enlarged partial schematic side view of the rear part of the nozzles of the turbojet engine of FIG. 1.

FIG. 3 is an enlarged plan view of a chevron according to the present invention.

DETAILED DESCRIPTION

Figure 1:
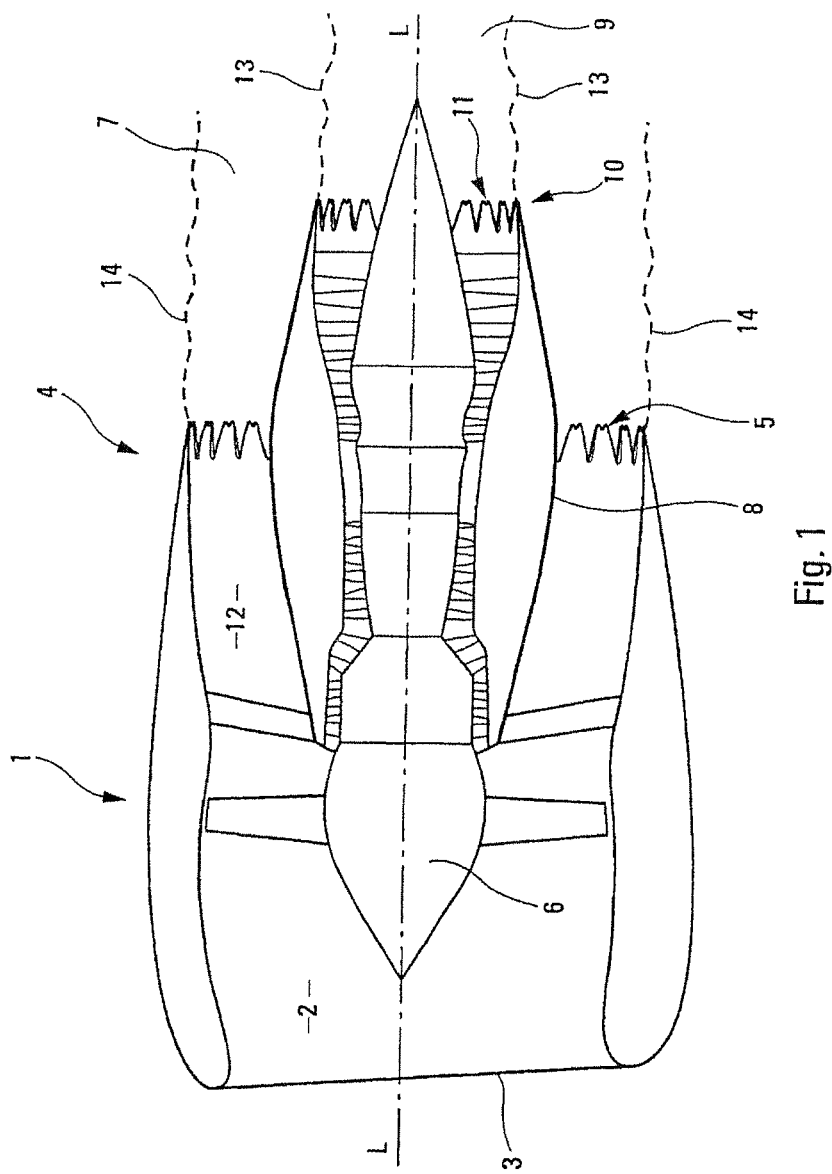
FIG. 1 is a schematic partial sectional view of a bypass turbojet engine, the nozzles of which are equipped with chevrons according to the present invention.

The bypass turbojet engine of known type, shown in FIG. 1, comprises a hollow nacelle 1 of longitudinal axis L-L comprising, at the front, an air inlet 2 provided with a leading edge 3 and, in its rear part, an annular air outlet nozzle 4 provided with a trailing edge 5.

Positioned inside said hollow nacelle 1 are:
- a fan 6 directed toward the air inlet 2 and able to generate the cold flow 7 of said turbojet engine, leaving via the nozzle 4; and
- a central generator 8 comprising, in the known way, low-pressure and high-pressure compressors, a combustion chamber and low-pressure and high-pressure turbines, and generating the hot flow 9 of said turbojet engine, said hot flow generator 9 comprising, in its rear part, a nozzle 10 provided with a trailing edge 11 for the hot flow 9.

The central generator 8 delimits with the nacelle 1 an internal duct 12 of annular cross section ending at the nozzle 4. The cold flow passes along the internal duct 12 and the nozzle 4 and exits via the trailing edge 5.

Thus, at the outlet of this known turbojet engine, the central hot flow 9 is surrounded by the annular cold flow 7, which enters the ambient air. FIG. 1 schematically depicts the boundary 13 between the hot flow 9 and the cold flow 7, and the boundary 14 between the cold flow 7 and the ambient air. Of course, at the boundaries 13 and 14, the fluids in contact with one another have different speeds, giving rise to the abovementioned jet noise.

In order to attenuate this jet noise, the outlet edge 11 for the hot flow 9 and/or the trailing edge 5 for the cold flow 7 are provided with chevrons distributed at their periphery, as has been illustrated in FIG. 2.

The example of a chevron 20.1, according to the present invention and depicted in FIGS. 2 and 3, comprises two lateral sides 21 and 22 of which the front ends 21A and 22A are secured to said nozzle 4 or 10. The lateral sides 21 and 22 converge toward one another with increasing distance rearward, without, however, meeting: what this means is that the rear ends 21R and 22R of said convergent lateral sides 21 and 22 are separated from one another. They are connected to one another via a curvilinear transverse line 23.1 which forms two lateral protrusions 24.1 and 25.1 respectively, separated by an intermediate recess 26.1.

In the chevron 20.1 the transverse line 23.1 is curvilinear and the protrusions 24.1, 25.1 together with the intermediate recess 26.1 are rounded, the lateral sides 21 and 22 are at least approximately rectilinear and the entire chevron 20.1 is symmetric with respect to a median longitudinal axis l-l, the overall direction of which is that of the jet 7, 9.

As illustrated in FIG. 3, the intermediate recess 26.1 may be symmetric, with respect to an axis a-a tangential to said protrusions 24.1, 25, to the sharp point 27 of the triangular chevron that would be formed by the two lateral sides 21, 22 were they to intersect at a vertex 28.

When the nozzle 4, 10 is in operation, the two rounded lateral protrusions 24.1, 25.1 generate, at the rear of this nozzle, a swirling vortex system containing pairs of contra-rotating vortices. It will be readily understood that the amplitude of this swirling vortex system is dependent not only on the length of the chevron 20.1 but also on the length of the protrusions 24.1, 25.1 and on the depth of the recess 26.1. Calculation and experimentation can be used to tailor the exact shape of said chevron 20.1 (and the distribution of the chevrons 20.1 about the orifice 2, 11) [see FIG. 2] to suit each particular nozzle 4, 10.

FIGS. 2 and 3 assume that two successive chevrons 20.1 are continuous and connected by a rounded portion 29.

Figure 4:
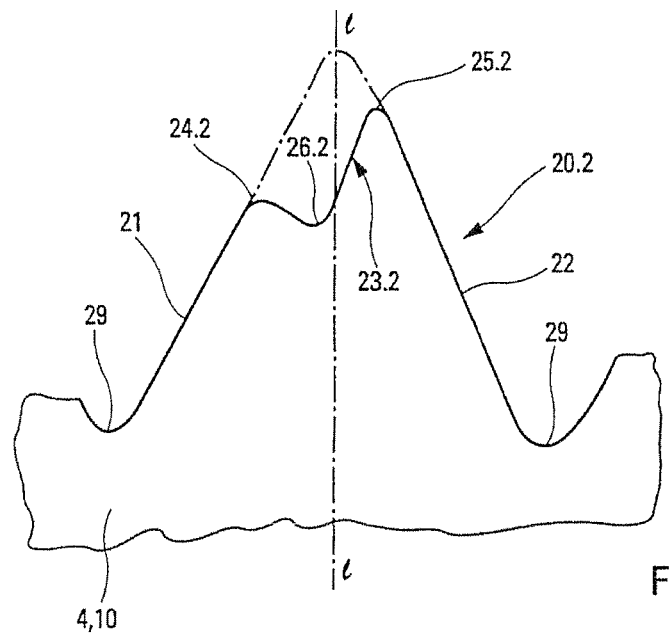
FIGS. 4 and 5 are plan views of alternative forms of embodiment of the chevron according to the invention.
Figure 5:
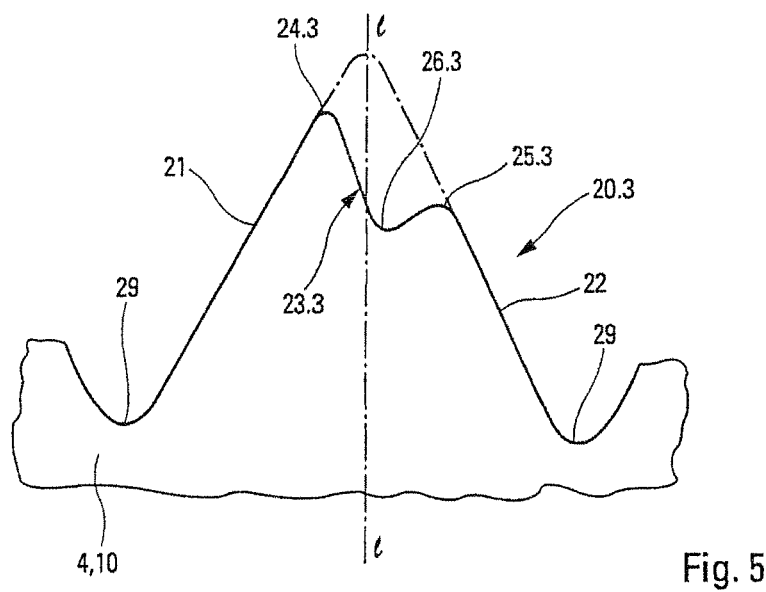

FIGS. 4 and 5 illustrate alternative forms of embodiment 20.2 and 20.3 of the chevron according to the present invention. The chevrons 20.2 and 20.3 differ from the chevron 20.1 in that the transverse lines 23.2 and 23.3, unlike the transverse line 23.1, are not symmetric with respect to the axis l-l. What this means is that, in the chevron 20.2, the rounded protrusion 24.2 is not set back as far as the rounded protrusion 25.2 whereas, in the chevron 20.3, the rounded protrusion 24.3 is set further back than the rounded protrusion 25.3. The rounded protrusions 24.2 and 25.2, on the one hand, and 24.3 and 25.3 on the other, are therefore asymmetric. The asymmetry between the two rounded protrusions 24.2, 25.2 of the chevron 20.2 and 24.3, 25.3 of the chevron 20.3 is then an additional parameter that can be used to influence the swirling vortex system generated by the chevrons according to the present invention.

Figure 6:
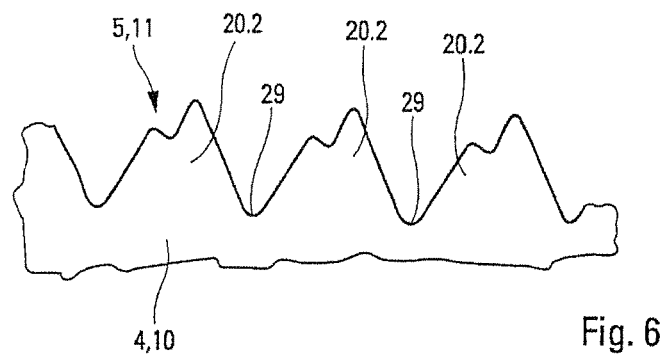
FIGS. 6 to 8 are (partial) plan views showing examples of how chevrons according to the invention positioned at the rear of a nozzle are arranged.
Figure 7:
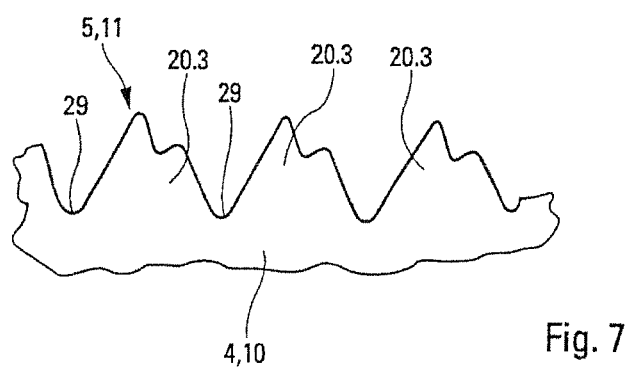
Figure 8:
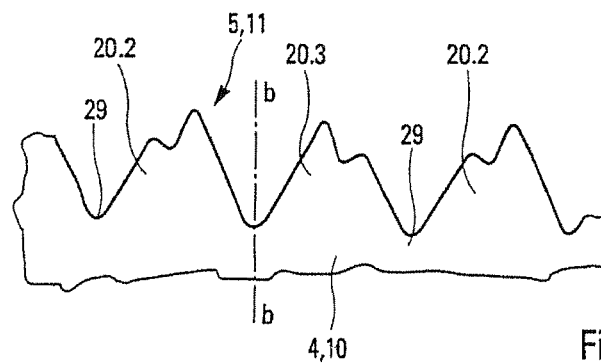

FIGS. 6, 7 and 8 depict, as a development, a nozzle edge 5, 11 formed by a series of chevrons 20.2, by a series of chevrons 20.3 and by a mixed series of chevrons 20.2 and 20.3 respectively.

In the case of the mixed series of FIG. 8, two consecutive chevrons 20.2 and 20.3 may be symmetric to one another with respect to a longitudinal axis b-b the overall direction of which is that of said jet 7, 9.

The invention claimed is:

1. A chevron (20.1, 20.2, 20.3) which is positioned at the periphery of an outlet orifice (5, 11) for the jet (7, 9) from a turbojet engine nozzle (4, 10) for the purposes of attenuating the noise of said jet and the shape of which is delimited:
   by two at least approximately rectilinear lateral sides (21, 22) of which front ends (21A, 22A) are secured to said nozzle (4, 10) and which, with increasing distance therefrom, converge toward one another without meeting so that rear ends (21R, 22R) of said lateral sides (21, 22) are separated from one another; and
   by a transverse line (23.1, 23.2, 23.3) which connects the rear ends (21R, 22R) of said lateral sides (21, 22) thereby forming two lateral protrusions (24.1, 25.1-24.2, 25.2-24.3, 25.3) separated by an intermediate recess (26.1, 26.2, 26.3),
   wherein said transverse line (23.1, 23.2, 23.3) is curvilinear in such a way that said lateral protrusions (24.1, 25.1-

24.2, 25.2-24.3, 25.3) and said intermediate recess (26.1, 26.2, 26.3) are rounded,
wherein the lateral sides (21, 22) of said chevrons are inclined symmetrically to one another with respect to a median longitudinal axis the overall direction of which is that of said jet (7, 9),
wherein said rounded lateral protrusions (24.2, 25.2; 24.3, 25.3) are offset from one another along said median longitudinal axis of said chevron (20.2, 20.3),
wherein no portion of the transverse line extends from the two lateral protrusions toward the nozzle as far as do the rectilinear lateral sides, and
wherein the transverse line and the intermediate recess are asymmetrical about the median longitudinal axis.

2. A turbojet engine nozzle of which the jet outlet orifice (5, 11) is provided with chevrons distributed at its periphery in order to attenuate the noise of said jet, wherein said chevrons are those specified in claim 1.

3. The nozzle as claimed in claim 2, wherein said chevrons are all identical.

4. A bypass turbojet engine comprising a nozzle for the cold flow and a nozzle for the hot flow,
wherein at least one of said nozzles is as specified in claim 2.

5. A bypass turbojet engine comprising a nozzle for the cold flow and a nozzle for the hot flow, wherein said nozzle for the cold flow and said nozzle for the hot flow are as specified in claim 2.

6. A turbojet engine nozzle of which the jet outlet orifice (5, 11) is provided with chevrons distributed at its periphery in order to attenuate the noise of said jet, wherein said chevrons are those specified in claim 1, wherein two consecutive chevrons differ from and are symmetric to one another with respect to the overall direction of said jet (7, 9).

* * * * *